(12) United States Patent
Pierce

(10) Patent No.: US 6,196,329 B1
(45) Date of Patent: Mar. 6, 2001

(54) DETHATCHER

(76) Inventor: Kevin J. Pierce, 6473 E. Lake Dr., Grand Forks, ND (US) 58201

( * ) Notice: Subject to any disclaimer, the term of this patent is extended or adjusted under 35 U.S.C. 154(b) by 0 days.

(21) Appl. No.: 09/443,908

(22) Filed: Nov. 18, 1999

(51) Int. Cl.[7] .................................................. A01B 33/14
(52) U.S. Cl. .......................... 172/543; 172/544; 172/552
(58) Field of Search .................................. 172/77, 21, 22, 172/518, 540, 543, 544, 553, 556, 573, 552

(56) References Cited

U.S. PATENT DOCUMENTS 2,020,524 * 11/1935 Smithburn ............................ 172/544
2,366,624 * 1/1945 Kelsey ................................. 172/544
3,945,441 * 3/1976 Van der Lely et al. ......... 172/552 X

* cited by examiner

Primary Examiner—Christopher J. Novosad
(74) Attorney, Agent, or Firm—Robert E. Kleve

(57) ABSTRACT

Broadly speaking, the invention comprises harrow apparatus for dethatchers. The harrow apparatus each has a plurality of pairs of harrow teeth formed of single steel rod with the ends of the rod forming a pair of teeth and with a pair coiled portion between the teeth and a projecting portion projecting away from the coiled portion and teeth with the teeth acting to engage the ground for cutting into the ground. A dampening coil also formed of a single steel rod has a pair of hooked ends and a pair of coiled portions intermediate the hooked ends and with a projecting portion projecting away from the coiled portions and the pair of hooked ends. The invention also includes a power drum for supporting and power rotating the pairs of harrow teeth and coiled portions. The power drum has a center tube with a plurality of slots for receiving the projecting intermediate portions of the pair of teeth and of the dampening coil. The coils of the pairs of harrow teeth are mounted to the drum to be spring baised in one direction and the dampening coils are mounted to the drum and harrow teeth spring biased in a lesser degree to urge the harrow teeth in the opposite direction and are hooked over the pair of teeth of the harrow device so that when the teeth engage the ground and are flexed rearward as a result of the engagement the coiled of the dampening member being biased on the opposite direction act to dampen or slow the otherwise sudden reactive spring return of the teeth by the teeth coil to thereby prevent damage to the harrow teeth.

3 Claims, 5 Drawing Sheets

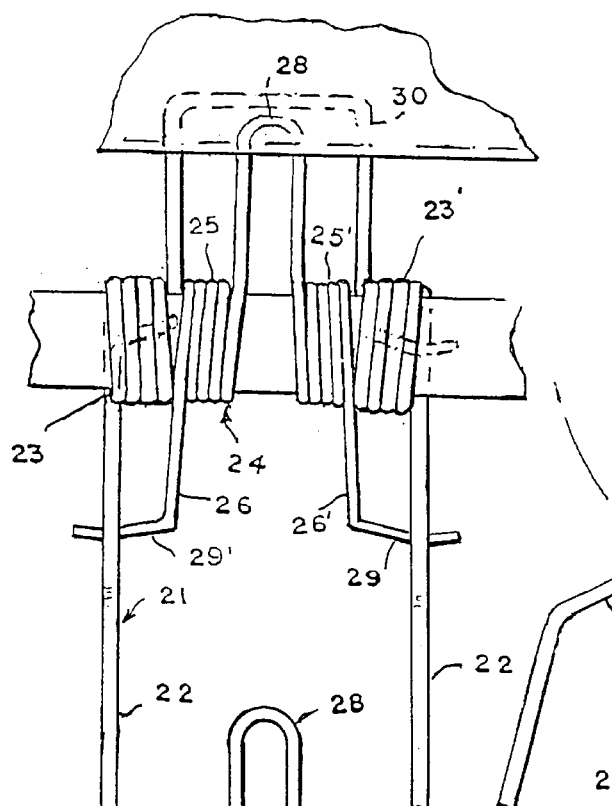
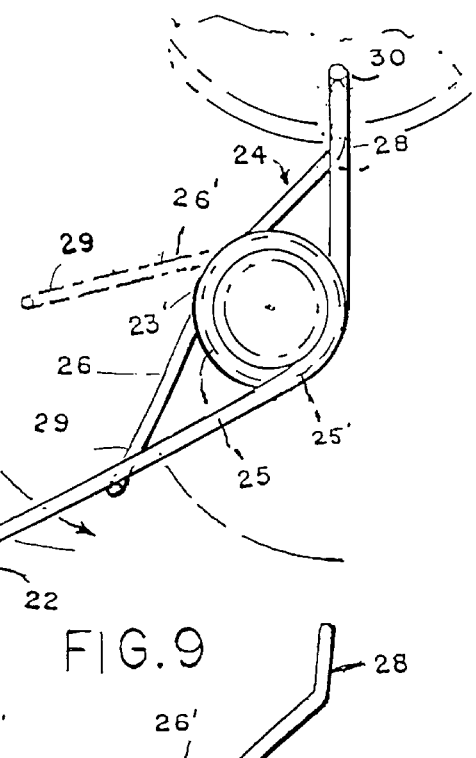
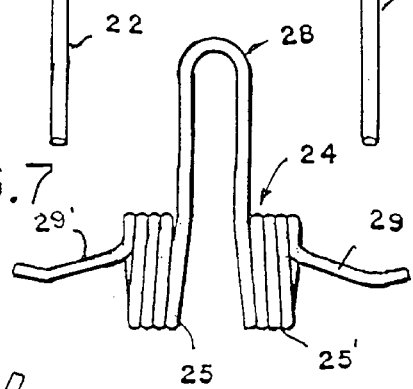
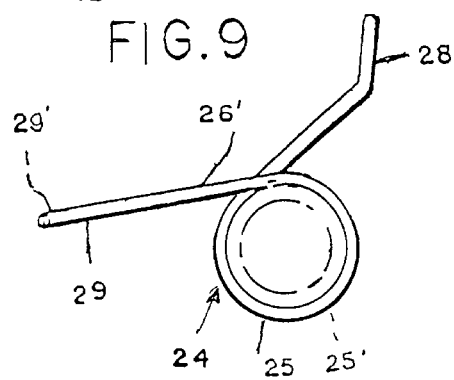
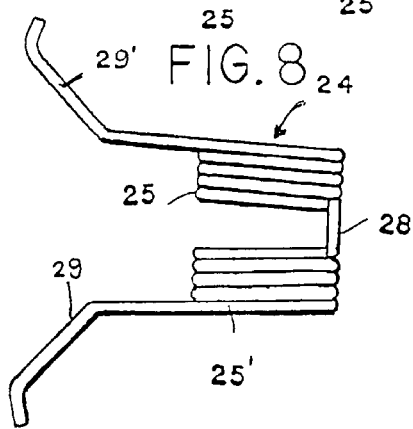

DETHATCHER

This invention relates to harrow or cultivator teeth apparatus and to the mounting structure in connection therewith. The subject matter of this invention is also related to an invention disclosed in a co-pending patent application U.S. Ser. No. 09/301,819, Filed Apr. 28, 1999 entitled: Dethatcher Apparatus, of which I am one of the co-inventors.

It is an object of the invention to provide harrow teeth and to a dampening attachment to harrow teeth The teeth and dampener both having a coiled portion with the coiled portion on the teeth providing a resilient flexing action upon the teeth biasing the teeth forward when the teeth are engaged in the ground and moved forward along the ground while engaged so that the teeth are flexed backward from encounter ground resistance in the engagement with the ground the foreward biasing will act to return the teeth to their normal position and with the coiled portion on the dampener providing a dampening coil spring attachable to the harrow teeth to bias the harrow teeth in opposition to the biasing action of the harrow teeth so that when the teeth are flexed rearward due to an encounter with the ground and then the ground d iased against forward movement and acts slow or dampen the reactive forward springing action of the harrow teeth so that there is a less sudden abruptiveness to the backward reactive movement of the harrow teeth after being freed of their engagement with the ground to protect the harrow teeth against damage and breakage due to this otherwise sudden reactive backward movement of the teeth once freed of the ground.

It is another object of the invention to provide a novel dampener to dampen or cushion the reactive action of harrow teeth upon being freed of their engagement with the ground after flexing to a biased position upon their engagement with the ground with the dampener acting to ease their sudden release from their engagement with the ground when the teeth are removed from the ground.

It is another object of the invention to provide a novel drum support for a plurality of harrow teeth that enables harrow teeth to evenly be removed from the drum to widen the spacing between the teeth upon the teeth engagement with the ground.

It is another object of the invention to provide a novel dampening coil spring member to be mounted to harrow teeth to bias the teeth in opposition to the coil spring biasing action of the teeth so that when the teeth are flexed in one direction due to a force against the teeth in that direction and then are otherwise suddenly free of the force action and are free otherwise to spring back suddenly and sharply to their normal position; the dampening coil spring member acts to counteract, slow and cushion the suddenness of the springing back action of the harrow teeth by providing a biasing action in opposition to the biasing action of the coiled portion of the teeth.

Further objects and advantages of the invention will become apparent as the description proceeds and when taken in conjunction with the accompanying drawings wherein:

BRIEF DESCRIPTION OF THE DRAWINGS

FIG. 5 is a front elevational view of the dampening coil with its hooked ends mounted to the pair of harrow teeth of a harrow tooth coil for dampening the return action of the teeth.

FIG. 6 is further enlarged fragmentary view of the plate of the harrow drum illustrating a side view of the harrow tooth dampening device with its hooked ends mounted to the harrow teeth on the harrow tooth drum.

FIG. 7 is a front elevational view of the dampening coil invention.

FIG. 8 is a top view of the dampening coil invention.

FIG. 9 is a side elevational view of the dampening coil with hooked ends invention.

BRIEF DESCRIPTION OF PREFERRED EMBODIMENT

Figure 1:
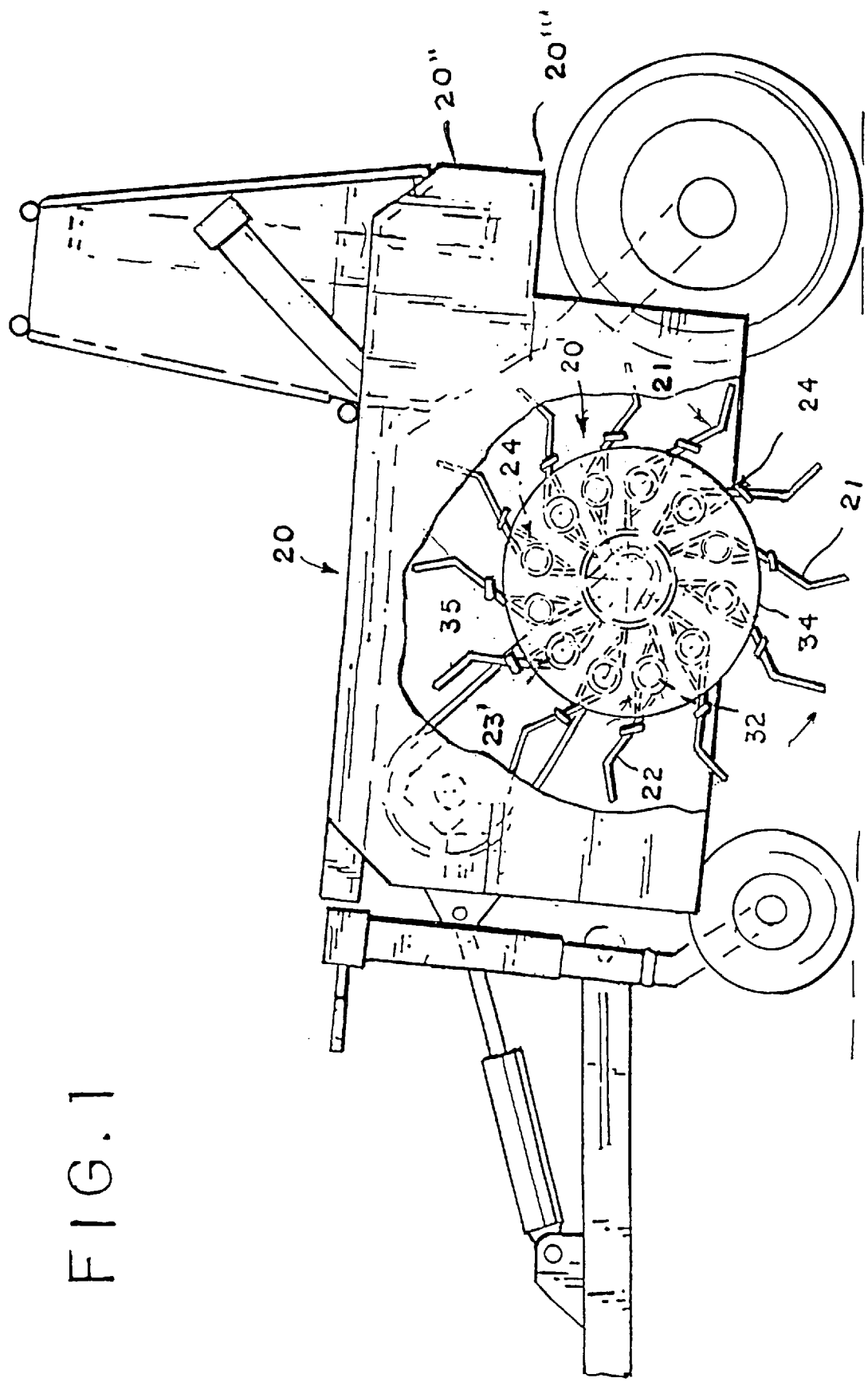
FIG. 1 is a side elevational view of a dethatcher and an end view of the harrow drum invention and the harrow teeth mounted on the power drum of the dethatcher and the dampening attachment coil with hooked ends attached to the harrow teeth.
Figure 2:
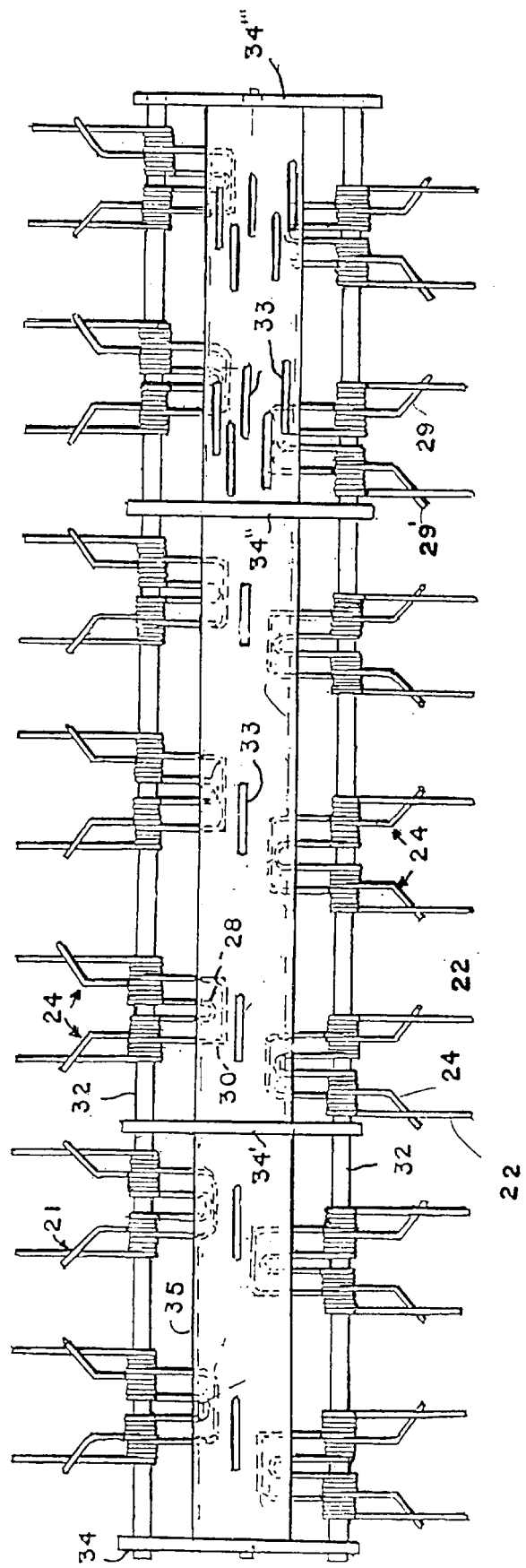
FIG. 2 is a side elevational view of the dethatcher drum and the plurality of harrow teeth mounted on two of the twelve mounting rods of the drum 180 degrees apart with the other mounting rods removed and the plurality of dampening coil attachments with their hooked ends attached to the harrow teeth on the drum, and illustrating the spacing of the slots on the center pipe to enable rapid change of the spacing between the teeth on the drum.

Referring more particularly to the drawings, in FIG. 1 the dethatcher harrow tooth apparatus 20 is shown mounted on the power drum 20' on the mobile frame 20" of a dethatcher 20'". The power drum is rotatably mounted on the frame and powered by a chain driven by a hydraulic motor mounted on the frame of the dethatcher to power rotate the drum 20", in a manner similar to and as already described in the co pending application.

The drum has four support plates or discs 34,34', 34" and 34'" fixed coaxially to a center tube 35. Each plate has twelve bores 31 at intervals about the circumference of the plates and twelve pipes 32 are slidably mounted in the bores. A plurality of harrow teeth 22 of the harrow tooth invention 20 are mounted on pipes 32 on the drum and each have a pair of teeth 22 and 22' and a plurality of dampener coil devices or inventions 24 are also mounted on pipes 32 on the power drum of a dethacher, as shown in FIG. 1 of the drawings. The rotation of the drum under power acts to cause the harrow teeth to engage the ground in a counterclockwise direction as shown by the arrow 33' in FIG. 1, as the dethacher moves from right to left in a manner similar to that already described in the co-pending patent application The power drum have a plurality of slots 33 therein in the center pipe 35.

The harrow tooth apparatus 20 has a plurality of harrow tooth deices 21 each formed of a single steel rod having a pair of harrow teeth 22 and 22' in parallel relation to one another with a pair of harrow coils 23 and 23' between the harrow teeth and with a center portion 30 formed between the coils 23 and 23'.

Each of the harrow teeth has a rearward bent outer end portion at their bent portions 22", so that the harrow teeth may be preformed with their upper portions 27 may be nearer to the pipe of the next row of teeth so that they will not flex forward as much before engaging the pipe to thereby reduce their flexing each time that the flex forward in reaction to their engagement with the ground.

The harrow tooth invention further has a plurality of dampening coil apparatus 24. Each dampening coil apparatus 24 is also formed of a single spring steel rod, with two coiled portions 25 and 25' intermediate its projecting elongated rods 26 and 26' with the ends of the rods forming hooked 29 and 29' respectively. The dampening coil device 24 also has a projecting portion 27 formed between the two coiled portions 25 and 25' and the hooked ends 29 and 29'. The two coil portions 25 and 25' of the dampening coil device 24 fit in between the harrow coils 23 and 23' of the dual harrow tooth device 21. The dampening coil device 24 its elongated hooked ends 29 and 29' are bent into two hooked ends respectively.

To attach the harrow teeth devices 20 to the drum their coiled portions 23 and 23' are slid onto the pipes 32 of the drum and their projecting portion 30 is slid into one of a plurality of slots 33 in the center pipe 35 of the drum. To attach the dampening coil device 24 to the harrow tooth device 21, the coiled portions 25 and 25' of the dampening coil are slid coaxially onto the same one of the peripheral pipes 32 of the drum, between the coils of the harrow tooth device; and the projecting portion 28 of the dampening coil is fitted between the protecting portion 30 of the harrow tooth device and both projecting portions are inserted in the same one slot 33 of the center pipe of the drum.

To attach the dampening coil device 24 to the harrow teeth device, the hooked end portions 29 and 29' of the dampening coil are drawn down counterclockwise from their preformed position shown in phantom lines in FIG. 5 and 6 to their position shown in solid lines, and hooked or attached over the toothed ends or harrow teeth 22 and 22' respectively.

Figure 4:
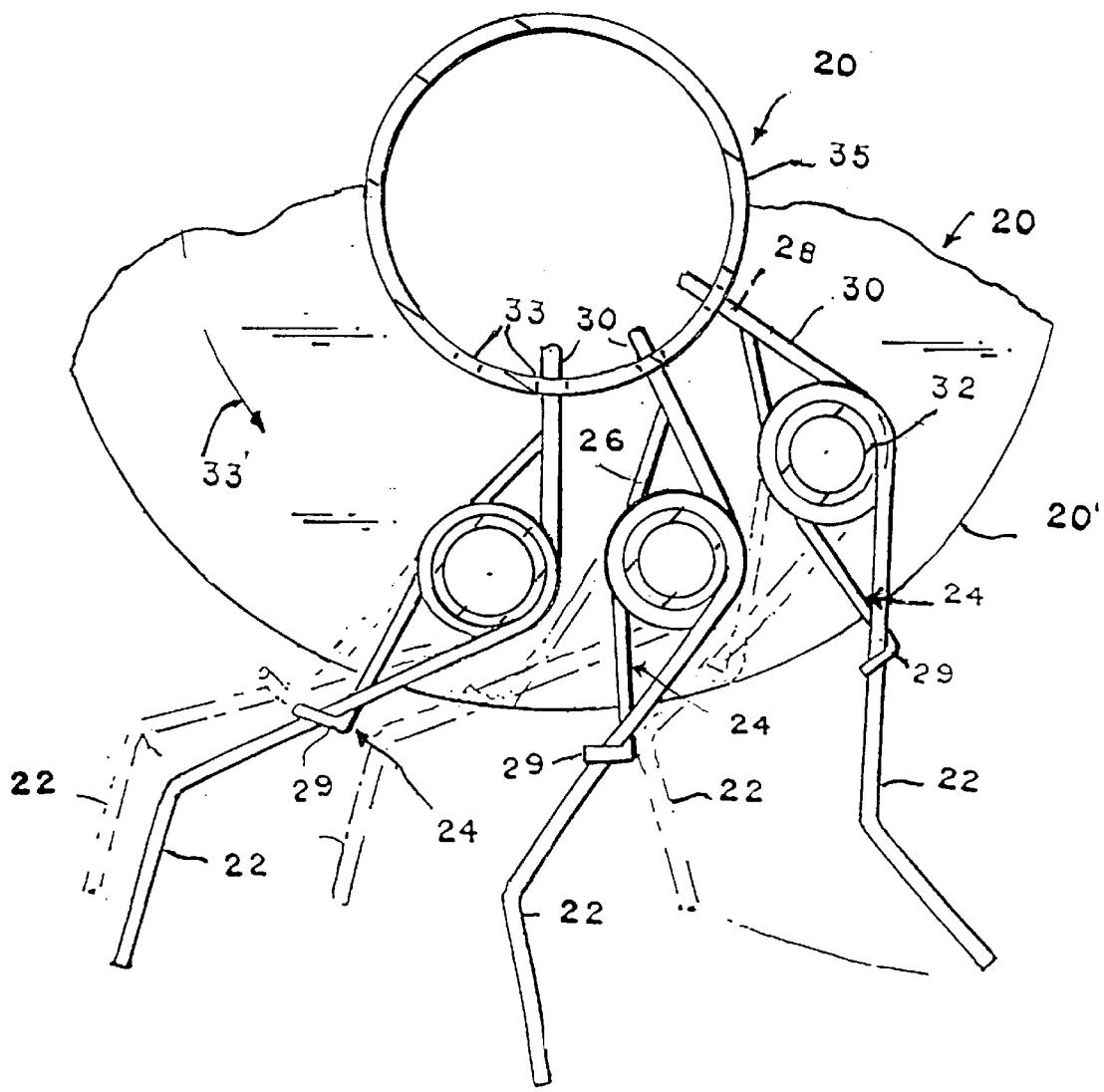
FIG. 4 is an enlarged fragmentary view similar to FIG. 3 illustrating the reaction of the teeth engaging the ground upon counter clockwise rotation of the drum and the movement of the teeth and their resulting movement in phantom lines and the associated movement of the dampening coils attached to the teeth in phantom lines.

The harrow tooth 21 is formed of rod thicker than the rod forming the dampening coil 24. The harrow tooth 21 is formed of a steel rod which has a thicker or greater diameter than the steel rod forming the damping coil 24, so as to be stronger than the dampening coil and so that the harrow tooth coils, when the dampening coils are attached to them, will draw the harrow teeth and also the hooked ends of the dampening coil toward and substantially near the position of the harrow teeth, as shown in FIG. 4 in solid lines, rather than them sitting in a middle position with respect to one another, when the harrow tooth is loaded or under load, by the dampening coil's ends being attached to the harrow teeth.

The dampening spring action of the dampening coil will work upon the harrow teeth whether the harrow teeth and the dampening coil are bolted to their mounting, or are simply mounted in a slot, as illustrated; as the operation remains the same under both circumstances.

When the coiled portions of the harrow teeth 21 and the damper coil 24 are operatively mounted on the pipe of the drum and their projecting portions are inserted in the slots of the drum and the dampening coil is attached to the harrow teeth, the coil portions of the harrow teeth provide a resilient return action to the teeth of the harrow and the while the hooked ends of the damper device act to dampen or reduce the suddenness of the return of the harrow teeth. The coiled portions of the harrow teeth bias the teeth forward from tight to left when viewed from FIGS. 1–4. inclusive. When the teeth are engaging the ground and the dethatcher is moving forward, with the power drum and the harrow teeth thereon and the dampening coils attached to the harrow teeth, are moving forward along the ground, while the teeth engage the ground as the drum rotates under power, the teeth will be flexed backward or left to right when viewed from FIGS. 1–4, inclusive, as a result from their encountering ground resistance in their engagement with the ground.

The forward spring biasing of the harrow coils act to return the teeth forward to their normal position as shown in solid lines in FIGS. 1–4. The dampening coil device 24 when its hooked ends are attached to the harrow teeth as shown in FIGS. 1–5, inclusive, acts to bias the harrow teeth in the opposition direction to the biasing action of harrow teeth coils. Consequently, when the teeth are flexed rearward due to their encounter with the ground and then thereafter the teeth become free of the ground; as the drum continues their power rotation, upon the teeth being free of the ground, the teeth are free to and will spring suddenly forward. This sudden forward springing action of the teeth has been found to cause fracturing of the harrow teeth after extended repetitive action of this type of coil biased teeth.

The dampening coil is attached to the harrow teeth to slow or dampen the reactive forward springing action of the harrow teeth so that there is less sudden abruptiveness to the backward reactive movement of the harrow teeth after being freed of their engagement with the ground. This dampening action of the dampening coils upon the harrow teeth when attached to the teeth has been found to protect the harrow teeth against damage and breakage due to this sudden otherwise uncontrolled reactive backward movement of the teeth, once freed of the ground engagement during their rotation on the drum.

The application also concerns the harrow drum of the dethatcher apparatus. The modified drum 20" has its twelve pipes 32 spaced evenly about the drum and mounted on the spaced plates 34, 34,, 34" and 34'" of the drum. The twelve pipes are located at even intervals about the circumference of the drum, so that the cutting width from teeth to teeth along the drum as the drum rotates may be varied by reducing the number of rows of teeth from twelve to increase the space between each tooth as the drum rotates by removing the number of pipes mounted on the drum; or decreasing the space in cut between each tooth by increasing the number by adding pipes and their teeth on the drum.

The drum has a four sets of twelve slots 33 each in the center pipe 35 at intervals about the circumference of the center pipe. The slots of each of the four sets are arranged in spirals of twelve slots spaced from one another to eliminate overlap when engaging the ground so that no two teeth engage the same exact location. Each set has slots 33 at locations 1,2,3,4. 5, 7,8,9, 10, 11, and 12 form the a spiral pattern in each set with the slots spaced from one another, so that removing rods at even intervals about the circumference of the drum, and thereby removing harrow teeth devices and dampening coils thereon evenly increases the space between the cuts 51 cut into the ground by the harrow teeth.

The co-pending patent application already referred to, shows the rotating harrow apparatus with a drum with ten pipes or tubes mounted circumferentially about the slotted drum on end plates However, the preferred construction of this aspect of the invention is the twelve pipes about the drum set forth herein and illustrated in the drawings.

Figure 3:
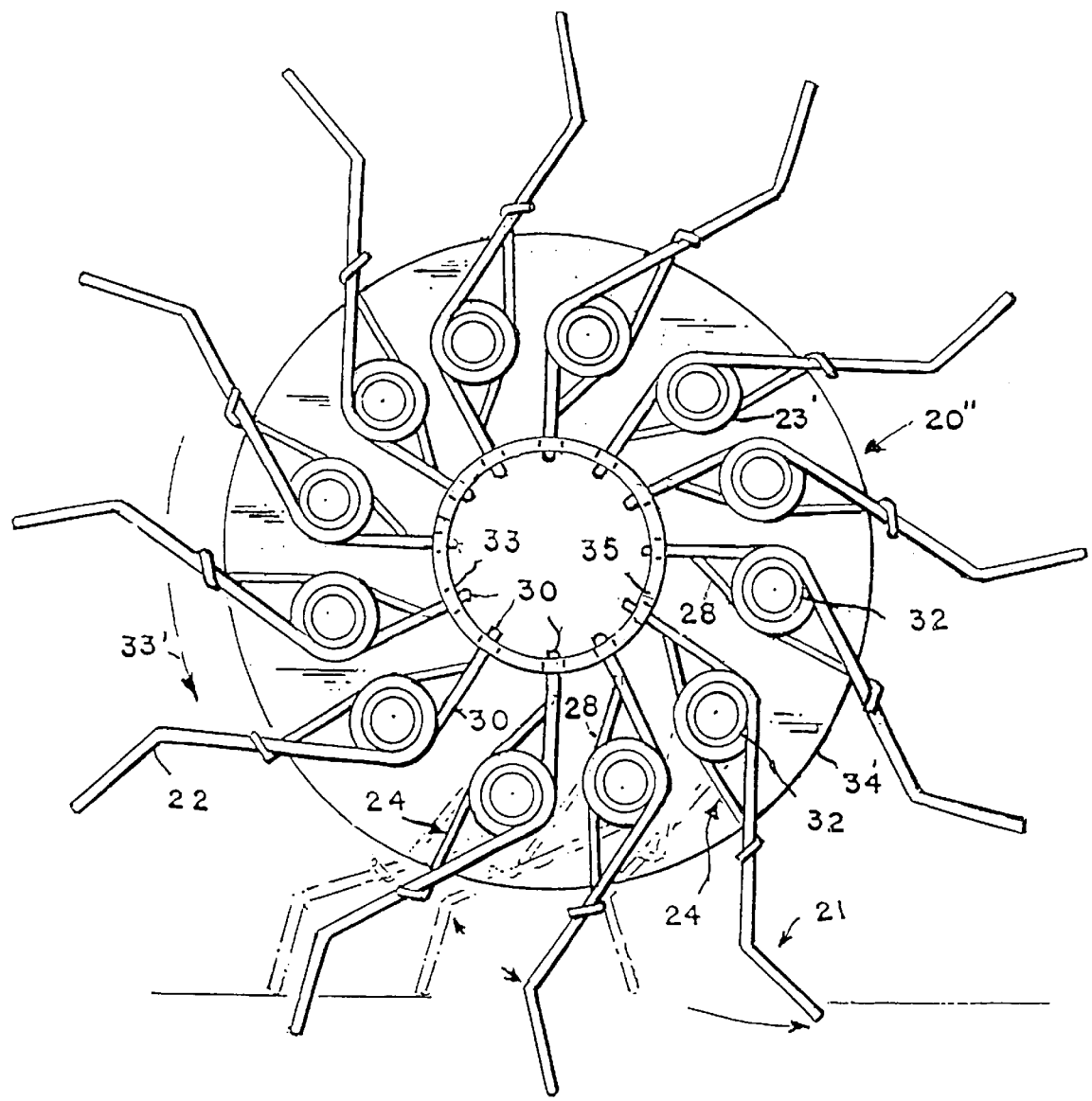
FIG. 3 is an end view of the drum with all twelve peripheral rods mounted to the drum and the harrow teeth and dampening coils mounted on all the twelve rods and the end plate cut away and illustrating in phantom lines the reaction movement of the teeth and dampening coil upon engagement with the ground with the rotation of the drum.

This illustrates twelve pipes mounted circumferentially about the center slotted drum in the bores of the end plates in the end views of FIGS. 1 and 3, with the spacing plates having twelve bores to accommodate twelve pipes or tubes 32, and with the twelve tubes or pipes each having rows of harrow teeth 24 mounted on the pipes and with the drum having spaced slots 33 at 12 intervals about the drum to receive the projecting portions 28 and 30 of the dampening coils 24 and pairs of harrow teeth 21 inserted in the slots 33 of the drum.

Providing twelve rows of pipes about the circumference of the drum, the pipes may be removed or replaced at further even intervals, as the cut of the harrow teeth is further divisable to widen or narrow the space between the cutting intervals provided by the teeth, than if ten pipes were employed.

Assuming, for example, the space between each pair of the harrow teeth 22 and 22' is five inches, the pairs of harrow teeth may be spaced from one another on the twelve pipes of the drums with the pipes providing twelve rows of teeth, for example, by removing ten of the twelve pipes leaving only two pipes in the drum spaced evenly about the drum; the spacing between the teeth at the teeth cut into the ground will be increased to a space of approximated 2½ inch. with a cutting width of ½ inch between teeth when no pipes have been removed from the drum. By removing every other of the twelve pipes and their teeth from the drum, leaving six pipes or tubes spaced evenly about the drum, the spacing between the teeth may be decreased to ¾th of an inch. By removing eight of the twelve pipes, leaving four pipes spaced evenly about the circumference of the drum 23'; the spacing between the teeth, when the drum is rotated, will be approximately one inch. By removing nine of the twelve pipes, leaving only three pipes with teeth spaced evenly about the circumference; the spacing between the teeth, when the drum is rotated, will be approximately 1½ inch. Finally with none of the twelve pipes removed, the spacing between the teeth would be approximately ½ inch.

Thus, the cutting width center of cut to center of cut is as follows when the space between each pair of teeth is approximately five inches:

| number of rows of pipe in the drum | Cutting width in inches | |
|---|---|---|
| | Approximate | Actual |
| 12 | ½ | .416 |
| 6 | ¾ | .833 |
| 4 | 1 | 1.25 |
| 3 | 1½ | 1.66 |
| 2 | 2½ | 2.5 |

Thus, the ease with which the pipes and their teeth may be varied in number makes it relatively easy to in turn vary the spacing between the cuts of the teeth on the green or grass as the dethatcher is pulled along the green or grass of the golf course.

The harrow teeth are made of rods sufficiently thicker or stronger than the dampening coil rod that the dampening coil will only slow the otherwise abruptiveness of the reactive return of the harrow teeth to their preformed positions after being freed of their engagement with the ground, and the harrow teeth will be sufficiently stronger than the dampening coil so as to reach nearly their preformed position when the dampening coils are operatively attached.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. In an apparatus hating a mobile support frame and a plurality of harrow type teeth apparatus with each tooth apparatus forming a pair of harrow type teeth at its ends with coiled portions intermediate its ends biasing the teeth in a forward direction and enabling the teeth to spring back forward to their unbiased position after being flexed significantly rearward as a result of encountering an obstacle in the ground and flexing rearward and then being freed of the load of the obstacle, a dampening coil comprising a steel rod having coiled intermediate portions and projecting ends with the ends being attachable about the harrow type teeth, said dampening coil being adapted to be mounted adjacent the harrow type teeth with the coiled portion biased in a forward direction opposite the direction of biasing of the pair of harrow type teeth, said dampening coil having its attachable ends drawable forward when attached to the harrow type teeth so as to urge the harrow type teeth rearward, said harrow type teeth halving a significantly stronger forward bias than the bias of the dampening coil rearward in the opposite direction so that the harrow type teeth, when under load by the dampening coil the dampening coil load alone will be insufficient to move the harrow teeth rearward, so that the harrow type teeth when freed of the obstacle will spring back forward to substantially their normal position under no load with the dampening coil attachment to the harrow type teeth acting only to slow or dampen the forward return movement of the harrow type teeth to their normal position.

2. In a mobile apparatus having a mobile frame with a plurality of harrow type teeth apparatus mounted on said frame with each harrow type teeth apparatus formed of a single rod with an elongated end portion serving as the tooth and a coiled portion biasing said harrow type tooth to spring back in one direction after being pressured in an opposite direction by the engagement of the tooth with the ground and upon removal of the pressure in said opposite direction, a dampening coil comprising an elongated rod having a hooked end means and a coiled portion with said dampening coil being adapted to be mounted on said frame adjacent said harrow type teeth apparatus with said hooked end of said dampening coil adapted to be flexed in said opposite direction and hooked onto said tooth of said harrow type teeth apparatus and with said coiled portion of said dampening coil biasing said hooked end in said opposite direction opposite the biased direction of the harrow type tooth so that when said harrow type tooth is drawn in said opposite direction by the engagement of the harrow type tooth with the ground, upon release of the ground pressure upon the harrow type tooth, the movement of the harrow type tooth in its spring return in said one direction with be dampened by the attachment of the hooked end of the dampening coil to the harrow type tooth.

3. In a mobile support frame and a rotary frame and a plurality of harrow type teeth apparatus mounted on the rotary frame with each tooth apparatus forming a pair of harrow type teeth at its end with a pair of coiled portions intermediate its ends biasing the teeth in a forward direction enabling the teeth to spring back forward to their unbiased position after being flexed significantly rearward as a result of encountering an obstacle on the ground and then being freed of the obstacle and with each tooth apparatus having a projecting intermediate portion for reception in the rotary frame, a dampening coil comprising a steel rod having coiled intermediate portions and a projecting intermediate portion, said dampening coil being adapted to be mounted with its coiled portions adjacent and coaxial with the coiled portions of the harrow type teeth apparatus with the coiled portions of the dampening coil biased in the opposite direction which is opposite the direction of biasing of the pair of harrow type teeth, said dampening coil having its projecting attachable ends drawable forward for attachment to the harrow type teeth so as to urge the harrow type teeth rearward, wherein the harrow type teeth have significantly stronger forward bias than the rearward bias of the dampening coil so that the harrow type teeth when under the load of the dampening coil alone it will be insufficient to move the harrow teeth rearward, and so that when the harrow type teeth are freed of the obstacle will spring back forward to substantially their normal position under no load with dampening coil action of its coiled portion will act only to dampen or slow the forward return movement of the harrow type teeth to their normal position.

\* \* \* \* \*